March 31, 1942.  H. M. A. STRAUSS ET AL  2,278,186
FOOD MIXER
Filed July 7, 1939  6 Sheets-Sheet 1

Inventors:
Herman M. Alfred Strauss
Watson D. Harbaugh
By Mann Brown & Cox
Attys.

March 31, 1942.   H. M. A. STRAUSS ET AL   2,278,186
FOOD MIXER
Filed July 7, 1939   6 Sheets-Sheet 2

Inventors
Herman M. Alfred Strauss
Watson D. Harbaugh
By Mann Brown & Cox
Attys

March 31, 1942. H. M. A. STRAUSS ET AL 2,278,186
FOOD MIXER
Filed July 7, 1939 6 Sheets-Sheet 3

Inventors:
Herman M. Alfred Strauss
Watson D. Harbaugh
By Mann Brown & Cox
Attys.

March 31, 1942. H. M. A. STRAUSS ET AL 2,278,186
FOOD MIXER
Filed July 7, 1939 6 Sheets-Sheet 4
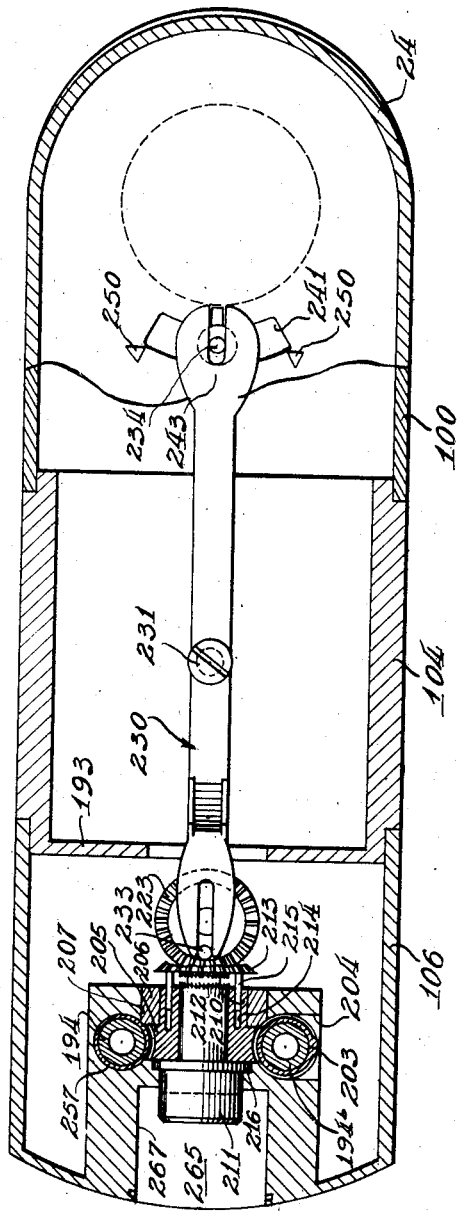
Inventors:
Herman M. Alfred Strauss
Watson D. Harbaugh
By Mann Brown Cox
Attys.

March 31, 1942.     H. M. A. STRAUSS ET AL     2,278,186
FOOD MIXER
Filed July 7, 1939      6 Sheets-Sheet 5

Inventors:
Herman M. Alfred Strauss
Watson D. Harbaugh
By Mason Brown & Cox
Attys.

Patented Mar. 31, 1942

2,278,186

UNITED STATES PATENT OFFICE 2,278,186

FOOD MIXER

Hermann M. Alfred Strauss and Watson D. Harbaugh, Chicago, Ill., assignors to A. F. Dormeyer Mfg. Co., a corporation of Illinois Application July 7, 1939, Serial No. 283,288

18 Claims. (Cl. 259—82)

The present invention relates generally to household appliances and more particularly to food mixers and food processing devices or the like.

In the present invention certain improvements, new constructions and arrangements of parts are provided with regard to the general operation and to the functions performed by the mixer; to the speed control mechanism; to the transmission; to the manner in which the power unit is mounted; to the processing of fruit as by the extraction of juice; and to certain improvements enabling manufacturing and inventory economies.

An object of the invention is to provide an improved juice extractor for citrus fruits which removes all the juice and tender pulp free of any unpleasant tasting skin oil and rough pulp.

Another object of the invention is to provide an improved speed control for the motor which is also conveniently managed by the same hand by which the motor is moved from place to place.

Another object of the invention is to provide an improved support for the power unit wherein the power unit may be locked in any one of a number of positions above the bowl including one wherein the beaters are lifted high enough to clear the bowl without dripping outside of the bowl, and the whole device can be picked up by one hand without need for varying any one of the selective positions in which the power unit is disposed.

Another object of the invention is to provide an improved power transmission wherein large power losses due to worm gearing at high speed stages is eliminated as in one embodiment of the invention, and all worm gearing is eliminated as in another embodiment of the invention, certain new and improved power transmission relations and economies in production being also accomplished.

Another object of the invention is to provide an improved detachable mounting for the power unit which eliminates conductive vibration and sound without permitting a freedom of movement that would cause contact between moving and stationary parts such as the beaters and the mixing bowl.

Another object of the invention is to provide an improved operating relation between the beaters and the contents of the mixing bowl which is selective for four different functions any one of which can be brought into operation readily in a very simple and easily understood way.

Another object of the invention is to provide an improved cooling system for the power unit of a food mixer wherein all ports are concealed from sight and located where there is little chance of foreign matter entering the motor compartment.

Another object of the invention is to provide an improved speed governor for fractional horsepower universal motors.

These being among the objects of the present invention, other and further objects will become apparent from the drawings herein, the description relating thereto, and the appended claims.

Referring now to the drawings:

Fig. 2 is a section taken upon a vertical plane passing through the axis of the motor shaft and showing in detail certain preferred structural chaarcteristics of the power unit;

Fig. 7 is a section taken upon line 7—7 in Fig. 2;

Fig. 12 is a section taken upon line 12—12 in Fig. 2;

Figure 1:
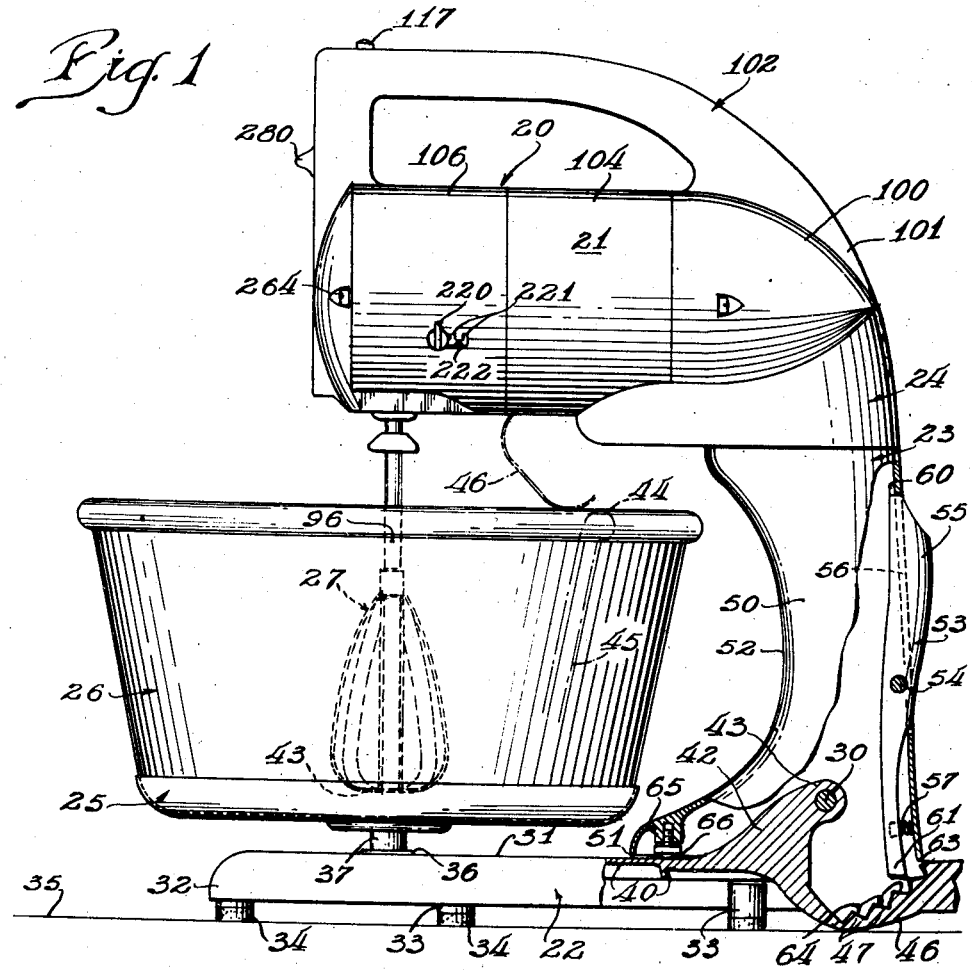
Fig. 1 is a side elevation, partly cut away, of an electric food mixer of the household type embodying the invention with the beaters and bowl in place.

Referring now to the drawings in further detail, a better understanding of the description following will be had if, as preliminary thereto, it is noted that the food mixer 20, illustrating an embodiment of the invention as shown in Fig. 1, is made up of an assembly comprising a power unit 21, a base 22, a standard 23 upon the base with an intermediate member 24 on top of the standard to support the power unit, a turntable 25 upon the base carrying a bowl 26 with beater elements 27 disposed in the bowl and driven from the power unit.

The base 22 and standard 23 are constructed of two separate cast metal pieces pivotally secured together by a horizontally disposed shaft 30.

The base 22 comprises a die-casting provided with a flat top 31 that is rounded outwardly and downwardly into flanges 32 to which are cast integral lugs 33 that carry rubber feet 34 to support the base above the table top 35 and against slippage.

Upon its forward part the base 22 has cast integral therewith a boss 36 in which is formed a socket which receives, in journalled relation, a shaft 37 supporting the turntable 25 whereby the bowl 26 may be rotated about its center. The turntable 25 is constructed to receive, in supported relationship, bowls of any size which are likely to be used with the mixer.

In addition to the depending border flange 32 the base 22 is provided with a plurality of crisscross web-like flanges 40 underneath the top for structural rigidity.

Toward the rear of the base the casting is provided with sufficient stock 42 to form an upwardly and rearwardly extending lug 43 which carries and supports substantially all the weight of the power unit 21. At this time it might be well to point out that this lug is so positioned that the shaft 30 which it receives, provides a horizontal pivotal axis about which the power unit may be rotated with the support through an arc of approximately 45 degrees by which the lower ends 43 of the beaters clear the edge 44 of the smallest bowl 45 capable of use with the mixer. The uppermost position of the beaters is indicated in broken lines 46. In addition to this, the shaft 30 lies within the horizontal plane of rotation of the lowermost part of the beaters 27 so that the beaters 27, when moved, come directly upward out of the bowl when the power unit is tilted. This relationship provides a construction wherein maximum accessibility may be had to any bowl 26 up the turntable 25 without obstruction by the beaters 27, yet the beaters 27 will not drip outside of the bowl but will drain back into the bowl as long as the bowl is left upon the turntable.

One of the chief objections to the conventional food mixers has been the interference offered by the beaters when the beaters are raised and the power unit is tilted up. In some cases lateral accessibility to the interior of the bowl is hindered also.

In addition to the lug 43 the rear portion of the base is provided with sufficient stock 46 into which rack teeth 47 may be cut, as shown in Fig. 1, the rear end portion (not shown) of the base extending far enough rearwardly to prevent tipping of the base when the weight of the power unit 21 is tilted vertically past the center of the shaft 30.

Before describing the function of the teeth 47 it would be well to consider first the structural characteristic of the support 23.

The support 23 comprises a hollow cast metal member 50 having a flared bottom end 51 which, when the power unit is in lowered position, follows the contour of the upper surface 31 of the base 22 as though it was originally secured thereto.

Although the support 23 may be of any suitable design, we prefer to have it taper from both ends to an intermediate narrow portion 52 which portion is, in length, approximately the width of an average hand. In this way a user is subconsciously directed to grip the support near its center as distinguished from its ends when the unit is to be lifted. This is desired because, in the gripping action, a means is brought into operation which prevents relative movement between the support and the base while the support is in the grasp of the user. This means comprises a latch lever 53 pivotally mounted as at 54 to the support with a portion 55 of the lever extending through a vertical slot 56 in the support, and beyond the outer contour at the point where it is most natural to grip the support. This exposed portion of the lever is continuously urged outwardly by a light spring 57 as limited by a stop 60 at the top thereof. The lower end 61 of the lever is constructed so as to mesh with the teeth 47 when the upper part 55 of the lever is pressed inwardly. The teeth are arranged upon a circle which clears the rear lower edge 63 of the support as the support tilts. The power unit and support are thereby free to tilt back and forth so long as the lever 53 is not pressed but when pressed the lever engages the teeth and prevents relative movement between the support 23 and the base 22. This locking relationship may take place at any one of the teeth depending upon the degree of tilt. The end 61 of the lever 53, in combination with the upper face 64 of each tooth 47, holds the member in engagement so long as there are forces exerted by gravity or otherwise which tend to induce a tilting movement of the support. In this way not only does the lever 53 operate to rigidify the support relative to the base when the support is lifted, but also may be employed to support the power unit 21 at a tilt point intermediate the tilt limits when the power unit is tilted vertically past the center of a shaft 30, i. e., towards the rear of the base 22.

Contact between the front edge 51 of the support and the base is prevented by a set screw 65 provided with a Bakelite head 66. By adjusting the set screw 65, the clearance between the end 43 of the beaters 27 and the bottom of the bowl 26 or 45 may also be regulated.

As more particularly shown in Fig. 2, the upper portion 67 of the support 23 has a bearing 70 with a double raceway cross-sectionally formed in the shape of a V. The intermediate member 24 is secured upon the top 67 of the support 23 by means of an integral raceway 71 upon the lower face of the intermediate member conically parallel to the lower part 22 of the raceway upon the support. A square headed and square shanked bolt 73 extends downwardly on the axis of the raceways mentioned and receives, upon the lower end thereof, a third member in the form of a modified washer 74 which slips over the lower end 75 of the square shank by which it is supported against rotation relative to the intermediate member and the bolt. The peripheral edge of the washer provides a raceway 76 conically parallel with the upper raceway 77 upon the support. Ball bearings 80 are disposed between the raceways and the lower end of the bolt receives upon it a nut and lock washer assembly 81 which, when tightened, loads the bearing by wedging the balls tightly in place whereby the intermediate member 24 is firmly secured upon the support.

Assemblage of the intermediate member 24 and the support 23 is had with the intermediate member down and the support bottom up. The balls 80 are dropped into place through the opening in the bottom of the support before the washer is installed, after which a long hex socket wrench can be inserted from the bottom of the support to tighten the bolt in place with sufficient pressure to load the bearing as already mentioned without causing a binding between the moving parts. After the intermediate member is fastened to the top of the support, the lever 53 is installed, after which the support is pivotally secured to the base by the shaft 30 which is forced horizontally through the support into the lug 43 on the base and again into the support on the opposite side of the lug. The assemblage is then ready to receive the power unit.

Figure 5:
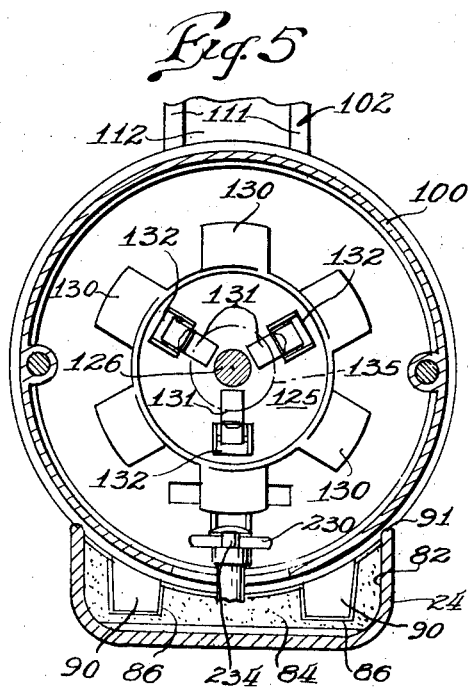
Fig. 5 is a section taken upon the line 5—5 in Fig. 2.

For the support of the power unit upon the intermediate member, as best shown in Figs. 2, 5 and 12, the intermediate member is provided with vertically and horizontally spaced troughs 82 and 83 in the body structure thereof which receive molded pieces of live rubber 84 and 85, respectively. The forward trough 82 is almost as long in a transverse direction as the motor housing is wide, as best seen in Fig. 5. The molded piece 84 of live rubber disposed in this trough has bonded therein spaced metal cups 86 located adjacent each end of the rubber. The cups 86 taper downwardly, as shown in Fig. 5, and rearwardly as shown at 87 in Fig. 2. Lugs 90 are cast integral with the motor housing to fit snugly within the cups 86 whereby at the forward end the power unit is supported entirely upon live rubber with sufficient space between the marginal edges 91 of the intermediate member and the motor housing to prevent contact therebetwen during operation of the food mixer.

The trough 83 is provided at the rear end of the intermediate member and receives a molded piece of live rubber 85, as shown in Fig. 12, in which is bonded an arcuate bottomed cup 92. Between the vertical sides 93 of the cup a horizontal pin 94 is supported. For engagement with the pin 94 the rear end of the power unit has cast therein a hook-like projection 95 opening upwardly and rearwardly to receive the pin so that when the power unit is brought into engagement with the intermediate member for support thereby the hook is inserted under the pin with an arcuate and rearward movement of the power unit which ends in a lowering of the front end of the power unit whereby the front lugs 90 drop into the cups 84 and are forced rearwardly by the inclined front edges 87 to hold the hook portion 95 in place.

The vertical and horizontal spacing of the live rubber supports are such that a plane passing through the three points thus provided pass between the center of weight of the power unit 21 and the beaters 27 at a point 96 upon the beater shaft closer to the beaters than to the transmission housing supporting the beaters. This provides a floating support for a power unit which absorbs torque vibrations developed by the beaters in performing their work, which torque or work load is below said plane of support. In this way it is practically impossible to unseat the power unit under operating conditions and the mass of the power unit provides an inertia which dampens any lateral sway that might be developed in the beaters.

In this connection it is to be noted that the beaters 27 are illustrated as arranged transversely to the power unit 21. This construction has a tendency to further reduce side sway of the beaters as distinguished from beaters arranged in other ways and more readily lends itself to the support in cooperation with the purposes of the support 23 than other arrangements. The food mixer 20 runs very quietly since, with this improved mounting the table top 35 or even the base 22 cannot serve as a sounding board. The motor vibration and noise that is inherent in universal type motors is stopped at the live rubber and is not transmitted any further as is the case with conventional constructions.

The power unit 21 preferably comprises three main parts. The rear cover part 100 to which the rear end 101 of the handle 102 is secured as by a flat headed screw 103, the middle portion 104, in which the stator of the motor 105 is supported; and, the front cover portion 106 which will be hereinafter referred to as the transmission housing. The forward end 107 of the handle is secured to the transmission housing by a concealed screw 110. All three of the housings are preferably constructed of die-cast metal with an overall contour somewhat bullet-shaped in its design and tapering at the rear.

The handle 102 is provided for lifting and managing the power unit and when it becomes desirable to remove the power unit from the intermediate member, as when using the power unit to mix food in a container upon a stove, the engagement between the power unit 21 and the intermediate member 24 is released by raising the unit more at the front end than at the rear and after the front end has been raised to a certain distance the unit may be moved forwardly.

The handle 102 is preferably constructed of insulating material, such as molded phenolic condensation compounds and is preferably secured rigidly in place at both the front and the rear.

The handle 102 is preferably hollow, having side flanges 111 joined by an upper intermediate portion 112, and, as illustrated in Fig. 2, is formed along gothic lines to provide a distinctive appearance. Between the flanges are located web portions 113 which slidably support a stiff piano wire member 115 which serves as a manual adjustment for the speed control mechanism. On the top of the handle at its forward end a slot 116 is provided through which a block 117 extends for movement forward and rearwardly along the handle. The portion of the block concealed within the handle is drilled to receive the control wire 115 to which it is rigidly secured by a set screw 120. The wire is roughened along its lower side to provide detents 121 where it passes through the forward one of the webs 113 to cooperate with a spring finger 122 secured to the web by bolt assembly 123.

At its rearward end the piano wire 115 is bent or otherwise conformed to provide a hook 124 which controls one of the contacts of a current interrupting speed governor inside the rear housing 100 as will now be described.

The speed control governor is housed within the confines of the rear cover member and comprises a radially disposed disk 125 made of insulating material secured to the armature shaft 126 by a tight fitting insulating hub 127 and carrying fan blades 130 integrally cast around its periphery. Centrifugally responsive fly weights comprising L-shaped members 131 are mounted at their ends to the disk 125 on brackets 132 secured to the disk by rivets 133. The fly weights are three in number located 120 degrees from each other and the inner ends 134 of the fly weight members ride against a slip ring 135 made of insulation loosely mounted upon the shaft 126. The slip ring in turn is provided with an inner race 136 of a ball bearing 137, the outer race 140 of which supports a second ring 141 of insulating material having diametrically opposite radial slots 142 in the face thereof facing toward the rear of the housing.

Figure 6:
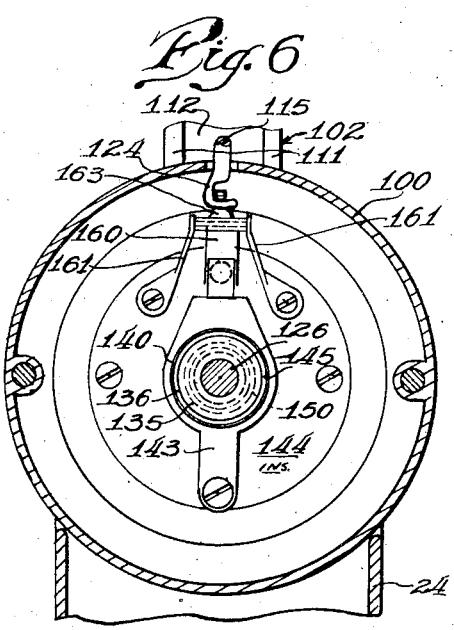
Fig. 6 is a section taken upon line 6—6 in Fig. 2.

A comparatively stiff arm 143 is secured to a stationary insulating element 144 in the rear housing and at an intermediate portion the arm is apertured as at 145 (Fig. 6) to receive the shaft 126 loosely without contact therewith and is provided with lugs 146 on the forward side thereof engaging in the slots upon the insulating ring 141. At its other end the arm is provided with a contact 147 and receives intermediate its ends the pressure of a spring 150 which collapses the centrifugal train operating the slip rings to move the contact as far toward the disk 125 as possible. In this particular construction the arrangement of parts and the spring to maintain the operating train in collapsed relationship brings about new and novel results relative to accuracy in speed control and enables the adjustment of the speed control to be made at the rear end 151 of the motor shaft 126 towards the ball bearing 152 at the front end 153 of the motor shaft. The ball pivot 154 at the rear end 151 is supported by a set screw 155 for this purpose which is threaded axially into the rear end of the rear housing where it is held in place by a locking nut 156.

The other contact 157 of the speed governor is carried by a lever 160 made of insulating material. This lever is supported upon the insulating member 144 by a bracket 161 with a spring 162 urging the depending arm of the lever away from the contact 147. The upper end 163 of the lever is arcuately formed so that the contact 157 is displaced according to a straight line function of the handle 117 throughout the major portion of its travel. Upon the opposite side of the insulating member a second contact 164 is supported and insulated from the first contact. The second contact 164 cooperates with a third lever 165 yieldably urged to engage the second contact 164 but limited in its movement in that direction by stop 166 so that when the handle 117 is moved the full length of its forward travel electrical contact between the second contact 164 and the third lever 165 is interrupted but can be reestablished with a rearward movement of the handle 117 when upon occasion it is desirable to start the motor.

This provides a start and stop switch which is simple in construction, easy to install and manipulate and which though separate and apart from the contacts 147 and 157 of the speed governor itself is associated in such a way that a single control may be employed to both start the motor and regulate its speed.

The insulating plate 144 also supports the spring 184 (Fig. 2) that urges the self-aligning bearing member 185 into edge-supported contact with the circular opening 186 provided for that purpose in the rear housing. Thus the rear end of the armature assembly, the power unit and the start and stop control assembly provide a new and novel construction.

At the forward end, in the preferred embodiment, as illustrated in Fig. 2, the transmission is shown as powered by a left hand helical gear 190 cut upon the front end of the armature shaft 153 and constructed so as to provide a resulting end thrust upon the armature which holds the armature against the rear adjustment 154 to study the governor assembly during operation of the motor. A bronze bearing 191 and upon occasion, if desired, a ball bearing 152 is employed to journal the front end of the armature in a boss 192 cast integrally with the front wall 193 of the motor housing.

Figure 3:
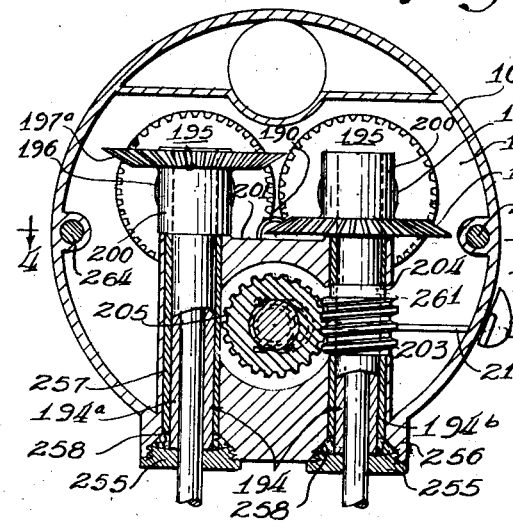
Fig. 3 is a section taken upon the line 3—3 in Fig. 2.
Figure 4:
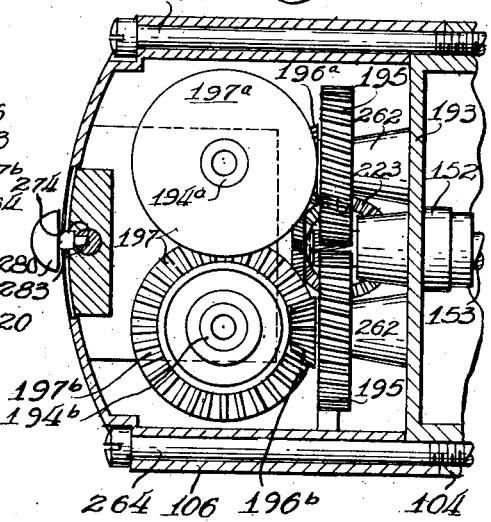
Fig. 4 is a section taken upon the line 4—4 in Fig. 3.

Referring now to Figs. 3 and 4 in conjunction with Fig. 2 the helical gear 190 is located axially in the center of the transmission housing. Spaced apart a distance equal to the distance between the beater shafts 194 are journaled two reduction gears 195 mating with and on opposite sides of the helical gear 190. The axes of the reduction gears are located a distance above the axis of the helical gear upon the motor shaft enough to permit engagement with the helical gear without touching each other.

Beveled gears 196 are formed separately or integrally with the reduction gears upon the forward side thereof and engage respectively a downwardly faced beveled gear 197a upon the beater shaft 194a and an upwardly facing beveled gear 197b upon the beater shaft 194b. The last two mentioned beveled gears, namely, those located upon the beater shafts are of a diameter greater than the distance between them.

In the practice of inventory economies the beveled gears 197 are identical in construction, and the reduction gears and their respective beveled gears are also identical in construction. The arrangement wherein the beveled gear 197b faces upwardly and the other one 197a downwardly accomplishes a turning of the beater shafts 194a and 194b in opposite directions.

In facing the beveled gears 197 one up and one down they are provided with shanks 200 which operate in conjunction with the upper face 201 of the stock which limits their downward movement to locate their teeth in mesh with the respective beveled gears upon the reduction gears. In this construction the beveled gears 197 can be made of a diameter to provide a greater gear reduction ratio than heretofore provided, so that between reduction gears 195 and the beveled gears 197 a speed reduction of 15 to 1 may be provided. Sufficient room over the top of the gear arrangement is hereby afforded in which to receive the condensers (not shown) at 202 (Fig. 2).

The transmission described is very simple in construction, being made of duplicate parts to accomplish inventory and manufacturing economies and can be readily assembled and brought into operation. Moreover, the space afforded in the motor housing is utilized to the fullest advantage with the load of the motor being distributed in a substantially balanced relation to two driven trains of gears to drive the beaters without any loss of power which has been conventionally encountered in worm gear drives between the motor and the beaters.

One of the shafts 194, as shown in Fig. 3, is provided with a worm gear 203 that may be slipped laterally into place before the sleeve shaft 194b supporting the beveled gear 197b is inserted, the stock supporting the sleeve shafts 194 being cut away at 204 for this purpose. This worm drives the centrally located ring gear 205 which is journaled in a washer 206 inserted in a longitudinal bore 207 held in place by a capscrew (not shown). The shank 210 of the ring gear rotates freely in the washer 206 and receives through the inside thereof a power shaft 211 that is toothed as at 212 to mesh with teeth upon a beveled gear 213 that is slidably mounted for forward and rearward movement upon the shaft 211. The ring gear is drilled as at 214 to receive driving pins 215 slidably therein as carried by the beveled gear 213. Although in some installations the beveled gear may be omitted and the power shaft and ring gear secured together, we prefer the relationship described wherein the worm drives the ring gear 205 and the ring gear drives the beveled gear 213 through the pins 215. The beveled gear 213 meshes with the power shaft when moved forwardly and thereby the power shaft is driven from the worm. The power shaft is held against axial displacement by the shoulder 216, to prevent the power shaft from being withdrawn or slipping forwardly from the transmission housing.

Movement of the beveled gear forwardly and rearwardly is accomplished through a yoke clutch lever 217 (Fig. 3) whose handle is indicated at 220 in Fig. 1 with the lever being locked in any one position by the three spaced catches 221 upon the edge of the slot 222 through which the lever extends in the side of the housing to receive the handle.

The rearward catch is the position in which the handle is located when it is desirable to drive the power take-off shaft. The middle catch is the neutral position while the forward catch is the position in which the handle is located when oscillation of the beaters in the bowls is desired, which will now be described.

A beveled gear 223 (Fig. 2) is mounted upon a shaft 224 supported in a sleeve bearing 225 as held in place by a cap screw 226. The shaft and sleeve are preferably inserted through the bottom of the transmission housing where they are held in adjustment by an end thrust ball bearing 227 and the escape of lubricant from the transmission housing is prevented by gaskets 228 between the head of the cap screw 226 and shoulder provided upon the transmission housing.

In oscillating the power unit so that the beaters move back and forth in the bowl upon an arcuate path, a lever 230 is pivotally mounted upon a bearing screw 231 where the lower part of the motor housing is provided with a threaded boss 232 to receive the screw. Both ends of the lever 230 are slotted to engage pins 233 and 234 upon the beveled gear 223 and an arm 235, respectively.

Although it is possible to develop an oscillatory movement by other means such as flexible shafts and direct gearing we prefer to employ the lever shown, because of its simplicity. The beveled gear 223, when driven by the slidable beveled gear 213 as when the handle 220 is located in the front catch of the notches 221, rotates carrying the pin 233 with it in a manner whereby the pin imposes a "oscillating" movement on the arm 230. This oscillating movement of the arm 230 is opposed at the other end of the lever where the arm 235 engages in the slot at that end of the lever. The arm 235 is rigidly fixed relative to the support 23 and serves to force the power unit by the leverage developed to move the beaters back and forth across the center of the bowl between the opposite sides thereof.

The arm 235 is constructed so that a user can set the mixer to perform any one of four mixing functions depending upon mixing requirements.

The arm 235 comprises an upper arm portion 236 pivoted about a horizontal axis on a pin 237 carried by a lower and larger stud member 240 which extends through an arcuate slot 241 (Fig. 7) in the floor of the intermediate member 24, and is threaded solidly into the top 87 of the support 23 where it is held in place against turning by a set screw 239.

The upper arm 236 has an integral, upwardly facing shoulder 242 upon which the rearward end 243 of the arm 230 rests when the slot receives the pin 234 which extends above the shoulder. In this connection, due to the fact that the power unit is removable, and replacement is not always had with care to align the slot and the pin 234, the body portion of the rear end 243 of the arm is widened to rest on the top of the pin 234 until the power unit is moved laterally to effect alignment. When alignment is had and the clutch handle 220 is moved forwardly, the beaters 27 are moved automatically back and forth from one side of the large bowl 26 to the other, as already described.

When it is desirable to have the beaters rotate constantly at a given position in a bowl, as when the smaller bowl 45 is used, the arm 236 is moved rearwardly, and, as provided with an integral knife catch 244 engageable in any one of three or more notches 245 in the floor of the intermediate member 24, the power unit is held rigidly in its set position. The position of the arm 236 in this instance is indicated at 246 in broken lines.

When upon occasion it is desirable to move the beaters back and forth by hand free of restraint, the arm 236 is moved forwardly to 247 where it comes to rest, preferably between stops 250 spaced apart, in the preferred form, a distance greater than is necessary to keep the beaters from contacting the sides of the large bowl 26. This is arranged for so that the user can press the beaters against the side of the bowl upon either side to scrape the sides free of such materials as flour which clings to the bowl without mixing.

Because of repeated blows between the arm 236 and the stops 250 in use, a loosening torque force for the stud 240 is created. To avoid this, the pivot pin 237 is located to one side of the center of the stud near the stops 250 and the stops are located to move very close to the stud. This minimizes the torque force, and the locking relation afforded by the set screw 239 both prevent loosening of the stud 240 during use of the machine. Moreover, the stud is provided with sufficient stock to prevent loosening of the arm 236 at the joint, a spring and detent 251 being provided to hold the arm in any one of its selected positions.

In this way a very simple device is employed for automatically oscillating the power unit and beaters while they are in operation and for controlling them manually during operation or for any given function desired.

Referring again to the transmission described, it is to be noted that in assembling it the sleeve shafts 194 are slipped into place from underneath the motor housing where they are held in place in a new and improved manner by gland nuts 255 threaded into a transverse boss 256 provided upon the lower wall of a transmission housing. The sleeve shafts 194 are journalled in bearing sleeves 257 and need not extend beyond the housing since with the particular embodiment illustrated there is sufficient room provided for adequate bearing length without this being necessary. This provides a very neat appearing and readily assembled construction with the gland packing 258 preventing the escape of lubricant from the transmission housing.

After the power shaft 211 and worm wheel assembly 205 is inserted in place, the sleeve shafts 194 are inserted upwardly in place, see Fig. 3. The beveled gears 197 are inserted into the transmission in alignment therewith in the positions described to receive the sleeve shafts in supported relationship and are locked thereto by lock screws 260 shown in Fig. 2 to provide a positive drive. The right hand sleeve shaft receives upon it the worm gear 203 that has been inserted in the opening 204 in the side of the casting stock where it is locked into place by any suitable means such as a set screw 261 to drive it with the sleeve shaft 194b. The beveled gear 213 is then mounted thereon and the beveled gear 223 is slipped into place. Then the sleeve bearing 225 and shaft 224 are secured in place.

The identical helical and beveled gears 195 and 196 are mounted upon the front wall 193 of the motor housing in bosses 262 and with these in place the transmission housing is slipped into place upon the reduced guide portion 263 of the motor housing. The beveled gears 196 mesh with the beveled gears 197 upon the beater shafts. In this operation care must be taken to see the beaters interdigitate properly. Thereafter the two housings are secured together by screw bolts 264, extending through the gear housing to be received in threaded bores to support the gear housing upon the motor housing.

With regard to the use that is made of the power take-off the front housing is provided at its lower front end in the preferred embodiment shown in Fig. 2 with a power take-off socket 265 bounded by diametrically opposite portions of cylindrical surfaces 266 connected by parallel flat surfaces 267.

A vertical bore 270 is provided running through the center of the power take-off socket near its open end to receive a dowel bolt 271 as more particularly shown in Fig. 2. This bore extends upwardly into the handle portion 107 as at 272 where a compression spring 273 is provided to force the bolt downwardly. For a spaced distance above the socket 265 the bore 270 is narrowly slotted in the form of a key hole slot 274 to open upon the front end of the gear housing.

In addition to the bore and bolt the gear housing is provided with a sliding door 275 operating in vertical parallel grooves 276 disposed upon both sides of the socket. At the top, the door 275 is apertured 277 to receive a winged bolt 280 which is threaded into the top of the bolt. This construction permits the socket 265 to be covered when not in use by the bolt 271 and door 275 being forced downwardly by the spring 273. Then, when upon occasion it is desired to use the socket, the winged bolt 280 is moved manually upwardly against the spring 273 to force the bolt and door upwardly to clear the socket for the reception of a food working attachment 281 (Fig. 13) therein. Once the food attachment is inserted in place the handle 280 is released and the bolt is urged downwardly to engage in a suitable keeper 282 provided upon the attachment to hold the attachment in place against and in engagement with the power takeoff shaft 211.

The assembly of this construction is had by fastening the handle 102 in place with the screw 110 inserted through an enlarged upper end portion of the slot 274. After this has been done the spring 273 is inserted followed by the bolt 271 and both are moved to their upper limits. The transverse bore in the bolt is exposed through the enlarged portion of the key hole slot. The door is slipped into place and the winged screw is threaded through the door into the bolt until two spaced flats 283 on the screw 280 align themselves with the narrow portion of the slot. Thereafter the winged screw 280 is released and the door and bolt are ready for operation as already described, thus providing a very simple arrangement for covering and uncovering the power outlet socket 265 and for latching an attachment in place, all at the same time.

Figure 9:
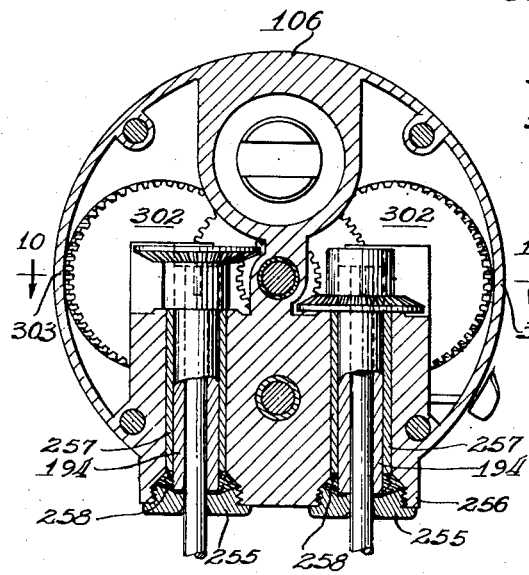
Fig. 9 is a section taken upon line 9—9 in Fig. 8.
Figure 8:
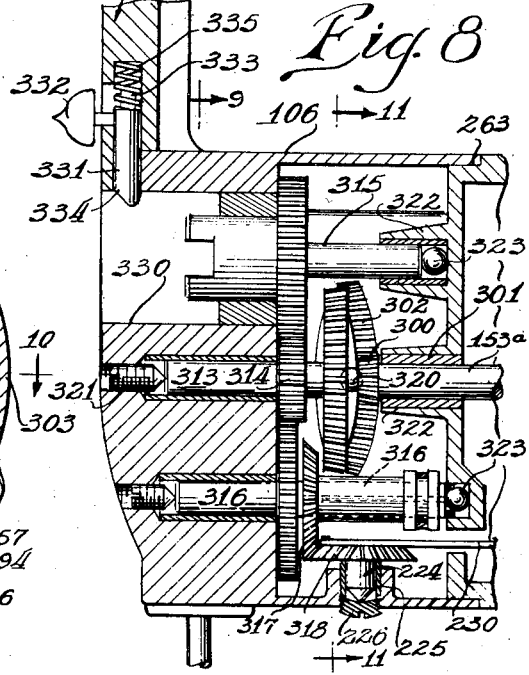
Fig. 8 is a view similar to the front portion of Fig. 2 illustrating another embodiment of the transmission housing and gears.
Figure 11:
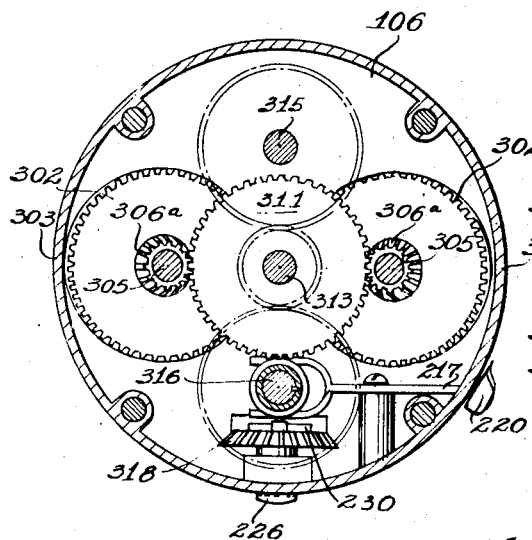
Fig. 11 is a section taken upon line 11—11 in Fig. 8.
Figure 10:
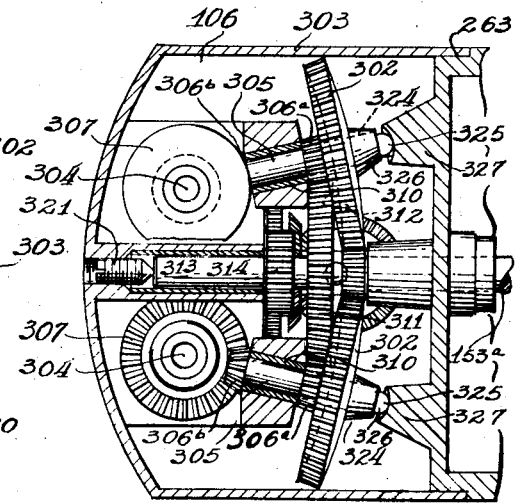
Fig. 10 is a section taken upon line 10—10 in Fig. 9.

Referring now to the modification of the transmission as shown in Figs. 8, 9 and 10, a construction is illustrated wherein all worm gearing has been eliminated.

In this particular embodiment, a beveled gear 300 is mounted upon the end of the motor shaft 153a but is slightly less than the outer diameter of the bearing sleeve 301 so that the gear and the sleeve are withdrawn and assembled together with regard to the housing whenever the armature is removed from or mounted in the housing.

In this particular embodiment two identical beveled gears 302 are employed of a diameter filling the space on each side of the beveled gear 300 between the beveled and the wall 303 of the transmission housing 106. This provides for maximum speed reduction at this stage.

This arrangement, however, places the centers of the beveled gears 302 a greater distance apart than the distance between centers 304 of the beater shafts. Although it is possible to employ hypoid gearing for driving the beater shaft, it is preferred to kant the shafts 305 supporting the gears 302 enough so that the axes of the shafts intersect the respective axes of the beaters. This kant is shown in Fig. 10 as in a horizontal direction but it will also be appreciated that a similar kant to the shafts could be had vertically also if, upon occasion, it was desired.

Each shaft 305 also carries a pair of small beveled gears 306a and 306b in front of the larger ones with the bevel tapering in the same direction as the larger gear bevel. The front gear 306b of each pair engages the beveled gears 307 that are employed to drive the beater shafts and are constructed somewhat similar to the front end of the motor shaft. A sleeve bearing 310 for each of the shafts is located between the two smaller beveled gears 306a and 306b and is insertable into place and locked there in any suitable manner when the transmission is assembled. The beveled gear 306a between the large bevel gear and the shaft driving bevel gear abuts the large gear 302 to engage upon opposite sides a common beveled gear 311 which, over a portion of its edge, runs within the confines of the large beveled gears 302 as at 312. In order to prevent scraping between the common beveled gear 312 and the large beveled gears 302, the large beveled gears are hollowed out to clear the common beveled gear. Thus in this particular construction the gear trains are driven by a common gear 300 and are also kept in step by a second gear other than the driving gear.

The common gear 312 as shown in Fig. 8 is mounted upon a shaft 313 along with a helical gear 314 of reduced diameter. The helical gear drives a primary power take-off shaft 315 above it and a secondary power take-off shaft 316 below it. The primary power take-off shaft 315 in this particular construction is driven continuously although I have shown sufficient clearance for a clutch (not shown) to be employed to release the primary power take-off shaft from the gear train when upon occasion it is desired.

The secondary shaft 316 through two beveled gears 317 and 318 operates the oscillating device for the power unit which, in construction, is sufficiently similar to that described already in connection with Figs. 2, 3 and 4 to be referred to by identical numerals indicating identical parts.

A ball bearing 320 is inserted between the shaft 313 supporting the common gear 311 and the motor shaft 153a to space them a predetermined distance so that the set screw arrangement 155 at the rear end of the armature shaft can be operated in conjunction with a set screw arrangement 321 at the front of the common gear shaft 313 to locate both the shafts against axial displacement and to tighten the clearances between the beveled gears 300 and 302 when, upon occasion, such is required.

The shafts used in supporting the gears are supported at both the front and the rear end in suitable bosses 322 with suitable end thrust constructions 323 as shown in Fig. 8 except for the kanted shafts 305 whose rear ends 324 are supported by ball bearings 325 engaging a concave face 326 upon a lug 327 cast integral with the motor housing. These concave surfaces are employed to obviate difficult assemblies yet provide sufficient centering support to maintain the shafts 305 against undue cocking and wear.

As in the case with the embodiment shown in Figs. 1 and 2 the beveled gears 307 driving the beater shafts are identical but reversely mounted to occupy a space upon each side of the common gear shafting 313 in the stock of the supporting structures.

In this particular embodiment, we do not choose to cover the power take-off socket 330 but merely to provide a latch arrangement 331 for power attachments which may be inserted in place through the power take-off socket and held by a winged bolt 332 in a manner similar to that described in conjunction with the embodiment illustrated in Fig. 2, a suitable lug 333 being provided upon the top of the bolt 334 to hold the spring 335 in position against displacement.

With regard to cooling the motor, the opening 252 cut in the rear housing 100 to receive the governor control 115 and the opening 253 provided to accommodate the arm 236 constitute concealed vertically spaced inlets for air drawn into the power unit by the fan 130. The outlet for the air is at the front end of the motor housing 104 upon the lower side thereof out of sight where a grill 254 is provided.

In this construction an advantage is had in rapidly cooling the motor even after the motor is stopped. The vertical spacing of the inlet openings and of the outlet opening 254 and the top inlet opening 252 along with the size of the opening made possible by concealing them, provides a means for convectively circulating air over the heated parts, thus providing an improved means for cooling the power unit.

Figure 13:
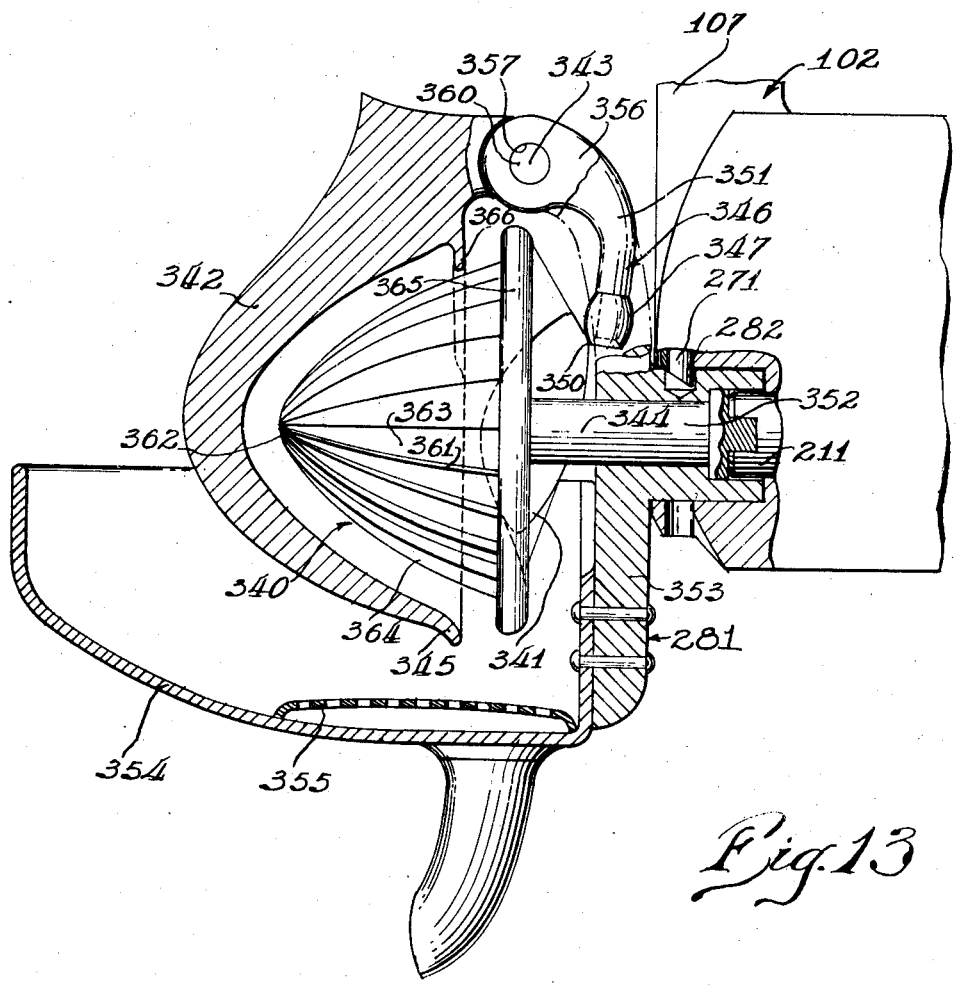
Fig. 13 is a side elevation of a preferred form of a food processing attachment, the like of which the power units is designed to operate.

Referring now to Fig. 13 it is a well known fact that the rinds of citrus fruit contain oils that are unpleasant to the taste and detrimental to the juice itself. Many of the conventional power-driven extractors ream the fruit at high speeds; speeds in excess of 100 R. P. M.; and in their operation remove and mix these oils with the juice and the soft pulp. Other extractors are hand operated and constructed to provide a direct squeeze under a rectilinear movement. With these, much of the desirable soft pulp is not removed. Still others are provided where the fruit is held or twisted by hand while a stationary part reams the soft pulp. This last type of extractor meets with the best results of the three general types, but is very slow and tedious.

In the present invention we provide a simple but effective construction wherein a reamer, revolving at a very slow speed, makes, preferably, less than one revolution during the application of mechanical pressure. The apex of the reamer engages the orange half at one side of the center where the pulp is soft, and from there advances into the orange along an arc parallel with the nearest side of the orange until the axes of the orange and the reamer coincide, at which time the greatest pressure is applied and after which the pressure is rapidly removed to permit the rind to be removed and replaced by a fresh orange half, the power take-off drive being disconnected while the replacement is being made.

The construction by which this is accomplished in its preferred form, comprises a reamer 340 provided with a cam surface 341 preferably upon its bottom side, and a female member 342 pivotally mounted for movement toward and away from the reamer about an axis 343 transverse to the axis 344 of the reamer. The inner contour of the female member 342 is approximately the outer contour of a large half orange (not shown) with a slight flaring away from the sides of the orange at the edges 345 so that the orange rind is expanded to and often beyond the breaking point at full pressure.

Movement of the member 342 and relative pressure between the member 342 and the reamer 340 is accomplished by a follower 346 upon the member 342 engaging the cam 341. The follower comprises a bead-like roller 347 whose effective leverage increases as it mounts to the inner side 350 of the cam. This leverage arrangement is the most effective for the purposes intended, although a cam can separate from the reamer itself may be employed within the teaching of the invention. However, with the cam 341 located as shown upon the back side of the reamer 340 the leverage and pressure constitutes a closed circle which eliminates bearing end-thrust problems generally encountered in conventional squeezers. In the invention shown, the effective pressure circle includes the reamer 340, the orange, the member 342, the arm 351 supporting the follower 347, the cam 341 and back to the reamer again. The pressure exerted is unlimited within the strength of the material, preferably metal, used in the construction of the unit and this pressure does not entail bearing end-thrust upon any of the supporting parts involved.

Considering now the construction of the bearings and the coacting parts of the juicer in further detail, the reamer is provided with a shaft 352 mounted in a frame member 353. The frame member 353 is supported in the power take-off socket 265 described earlier, and when so mounted is held in place by the snap latch 271, which holds the end of the shaft 352 in driven engagement with the power take-off shaft 211. The frame 353 also removably supports a juice catch 354 and strainer 355 under the juicer.

This construction eliminates juicer gearing conventionally employed in food mixers and permits the handle 102 to be secured permanently in place on the power unit 20. The handle can be gracefully fashioned without making conventional allowances for juicer bowl and other parts upon the top of the motor or gear housing, and all openings on top of the housing that collect foreign matter and become clogged are eliminated.

Two laterally extending horns 356 are formed integrally with the frame 353 and have coaxial holes 357 through their end portions which receive a shaft 360 that journals the female member 342 for its operation, as already described. The arm 351 extends from the member 342 between the two horns 356 where it is free to move between them into engagement with the cam 341.

The cam 341 construction upon the reamer is such that for three-quarters of each turn of the reamer, the female member 342 is advanced to full pressure, rapidly at first and gradually slower toward the end, with a quick return to spread position over the remaining fourth of a turn.

The axis 343 of the shaft 360 may be vertical or horizontal or inclined to either. In the drawings we have shown it horizontal so that its correct relation with the other parts can be more readily understood. In actual practice, however, we prefer to have the shaft within thirty degrees of vertical so that the widest portion of the spread between the member 342 and the reamer 340 is located where an orange can be slipped readily into place and the rind removed, it being understood that this spread need not be as wide as one would think since the taper of the reamer and the wide arc of the mouth of the member 342 permit an orange half to be slipped into place with little trouble even with close clearances. This compared with rectilinear actions of conventional extractors permits of added advantages in having a short cam throw and extreme pressure within one revolution of the reamer or drive shaft.

The reamer 340 itself is constructed upon its working surface to press against the orange half without digging into the pulp as it revolves, yet provides adequate channels for the juice and crushed soft pulp to flow freely from the pressure areas.

To do this, the ribs 361 radiate from the apex 362. The leading faces 363 of the ribs are inclined, while the trailing faces 364 break sharply away from the ridge of the ribs preferably at right angles or along radial planes to the leading edges of the leading faces that follow. The incline squeezes without rending and the trailing faces provide channels permitting the juice to flow freely from the reamer without further restraint and to carry with it the crushed soft portions of the pulp which give orange juice its proper and pleasing body.

At its edges 365 the reamer is flared outwardly radially and back upon itself slightly to catch the edge of the orange rind if, upon occasion, the orange half is not initially located correctly in place. As a general rule any upset of the orange half between the members that may take place will be toward the shaft 360. This side of the member 342 bears the greatest load, so upon the inside of the member 342 particularly upon this side, a circular ridge 366 is provided. This permits some correction of the position of a misplaced orange rind when the rim 365 on the reamer 340 engages the cut edge of the orange half.

It has just been indicated that the area of greatest pressure is on the shaft side of the member. The construction shown permits the member 242 to be lightened measurably. Extra stock of strengthening metal is confined to that side where the greatest strain is borne under a short leverage throw and the member is lightened upon the far side where extra pressure upon the member is negligible. The bite of the reamer starting in the orange half and working parallel with that side instead of directly against it makes the load light upon that side. This arrangement also has an inherent advantage in preventing a turning of the orange between the member, since, for the orange to follow the rotation of the reamer, the thickness of the unjuiced part of the half orange would have to enter the narrower clearance between the members for any given position of the members except when they are fully closed. Moreover, the construction of the ribs do not furnish much purchase for turning the oranges, and this, in combination with the wedging inhibition, permit the oranges to turn very little, if any, in the squeezing operation.

In this way, a simple and unusually effective citrus fruit juice extractor is provided that is novel in its construction, operation, and the results attained.

Having thus described our invention, it will be apparent that certain improvements, new constructions and arrangements of parts are provided with regard to the general operation and to the functions performed by the mixer; to the speed control mechanism; to the transmission; to the manner in which the power unit is mounted; to the processing of fruit as by the extraction of juice; and to certain improvements enabling manufacturing and inventory economies.

Consequently, although we have shown and described certain preferred embodiments of the invention, it will be apparent to those skilled in the art that various uses, modifications and changes may be made without departing from the spirit and substance of the invention, the scope of which is commensurate with the appended claims.

What is claimed is:

1. In a household food mixer having a unit provided with depending interdigitating beaters, means for driving the beaters, a base, and a turntable for supporting a bowl under the beaters upon the base, the combination of a support pivotally mounted for movement about a horizontal axis lying substantially in the plane of the bottom of said bowl, means for locking the support relative to the base in a plurality of relative positions, a supporting member on top of said support for supporting the unit for movement about a normally vertical axis, and means moving said supporting member about said vertical axis when the unit is moved about said horizontal axis.

2. In a food mixer, a horizontally disposed power unit, a support, a beater carried by the power unit, and vibration absorbing resilient means supporting the unit upon the support at spaced points lying in a plane intersecting the beater shaft between the power unit and the work portion of the beater.

3. In a mixing machine, a support, a plurality of bowls, means for supporting any one of the bowls proximate said support, a power driven carriage assembly movably mounted upon said support, a beater carried by the carriage, the combination of means for oscillating said carriage automatically in a horizontal plane during operation of the beater in one of said bowls including manually operated device for freeing the carriage of said oscillation for manual movement and selectively restricting the movements of said carriage between wide and narrow limits.

4. In a mixing machine, a support, a plurality of bowls, means for supporting any one of the bowls proximate said support, a power driven carriage assembly movably mounted upon said support, a beater carried by the carriage, the combination of means for oscillating said carriage automatically during operation of the beater in one of said bowls including manually operated device for interchangeably coupling the oscillating means and arresting said oscillation selectively between a full restriction and a partial restriction without affecting operation of said beater.

5. In a mixing machine, a support, means for supporting a plurality of bowls adjacent said support, a carriage movable upon the support, a beater carried by the support and operable in any one of said bowls, the combination of means for varying the position of the beater in any one of the bowls automatically and manually, including a manually adjustable rigid part upon the support, a driving means operated in conjunction with the beaters engageable relative to the rigid part at will and means for engaging said rigid part for locating the beaters in the bowl at a given position.

6. In a mixing machine, a plurality of mixing bowls of different sizes, means for supporting any one of said bowls for rotation about a predetermined axis, a unit movably mounted with regard to the bowl supporting means, a beater carried by said unit locatable in said one of the bowls, the combination of power driven means for driving and oscillating said beater in said bowls through a curvilinear path less than a circle, means for arresting said oscillatory movement at a predetermined point for locating said beater for operation in the smallest of said bowls, and means for tilting the unit to withdraw the beater from the bowl to a point proximate one edge of said smallest bowl, said arresting means preventing lateral movement of the beaters when so raised.

7. A food mixer comprising a support, a beater supporting and driving unit detachably mounted upon the support for ready removal, means operated by the driving unit for oscillating said unit comprising a rotatable member, a member reciprocably mounted with respect to the unit and a detachable connection between said unit and the support readily engageable when the unit is placed upon the support for rendering said reciprocable member effective.

8. A household food mixer comprising a support, a beater supporting and driving unit detachably mounted upon the support for ready removal, means operated by the driving unit for oscillating said unit comprising a rotatable member, a member reciprocably mounted with respect to the unit and a detachable connection between said reciprocable member and the support and between the reciprocable member and the drive of said unit to render them ineffective at will.

9. In a household mixer having a base, a support, means on the base for supporting a plurality of bowls of different sizes and a power unit extending over said means and carrying interdigitating beaters disposed transversely thereto, the combination of means for pivotally supporting the unit upon the support for horizontal movement, means pivotally mounting the support for movement thereof and the unit for vertical movement, and means for varying the position of the beater in the larger of said bowls automatically including a device for disconnecting said varying means for manual movement of the beaters laterally when the unit is moved vertically.

10. In a household mixer having a support, a power unit and interdigitating beaters supported on and driven from said unit, the combination of means supporting the power unit for pivotal movement about a vertical axis to permit movement of the beaters horizontally, means pivotally mounting the motor for movement about a horizontal axis, transmission means for oscillating the beaters horizontally, and means for engaging and disengaging said transmission to release said power unit for movement of the beaters laterally when the beaters are raised.

11. In a mixing machine, a plurality of mixing bowls of different sizes, means for supporting the smallest of said bowls, a unit mounted to overhang the bowl supporting means and a beater carried by said unit disposed in said smallest bowl, the combination of power driven means for driving and oscillating said beater in said bowls through a curvilinear path less than a circle, means for arresting said oscillatory movement at a predetermined point for locating said beater for operation at a fixed point in the smallest of said bowls and means for tilting the unit to withdraw the beater from the bowl to a point above the bowl where material upon the beaters will drip back into the bowl, said arresting means holding said beaters at said point against lateral movement when the beaters are so raised.

12. In a power device comprising a motor unit including an oscillating member driven from the motor shaft, a food processing tool carried by said motor unit, a member mounted pivotally for movement about a predetermined axis, the combination of a selectively adjustable means operatively associated with said tool and oscillating member for engaging said member in one position for oscillating the power unit about said axis and selectively movable to other positions for optionally locating the power unit at any one of a number of set positions to restrict and permit freedom of movement to the motor unit between limits.

13. In a food mixer, the combination of a horizontally disposed power unit comprising a housing member, a support, a beater carried by the power unit, an interlocking couple and a lug and socket couple between the housing and support at spaced points, which points are disposed in a plane intersecting the beater shaft between the power unit and the work portion of the beater, said lug and socket means including a resilient element disposed in power-unit weight bearing relationship, and said interlocking couple including a vibration absorbing means which disposes the lug and socket in cooperative relationship.

14. In a food mixer, the combination of a horizontally disposed motor housing comprising a central motor-enclosing portion having a depending lug upon the bottom thereof, a rearward portion having one member of an interlocking couple thereon, a beater carried by the power unit, a support including the other member of said interlocking couple, means for resiliently supporting one of said interlocking members, and resilient means carried by the support cooperating with said lug to maintain the interlock of the couple under operating conditions.

15. In a food mixer, a power unit having a food processing tool detachably connected thereto, a support, means for supporting the unit upon the support comprising a molded elastic body yielding in one direction to bear the weight of the unit in supported relation and yielding in another direction to permit limited lateral movement of the tool under working conditions, and means detachably securing the power unit in said supported relation.

16. In a food mixer, a horizontal power unit having a plurality of beaters detachably connected to it by beater shafts adjacent one end, a support extending along and following the general contour of the power unit over a portion of its length, resilient means for supporting the unit upon the support at spaced points including molded bodies of elastic material whose composite resiliency predetermine relative movement between the unit and support more readily along a line intersecting the beater shafts at a point above the beaters.

17. In a food mixer, a power unit having a plurality of beaters detachably connected to it adjacent one end, a support having a portion disposed proximate said unit, and molded means made of elastic material disposed between the support and unit in readily disengageable weight bearing relation and constituting the sole mechanical connection between the unit and the support to permit relative movement between the unit and support under working conditions.

18. In a food mixer, a power unit member having a food processing tool detachably connected thereto, a support member, means for supporting the unit upon the support comprising an elastic body having rigid inserts embedded therein, lugs on one of the members for detachably engaging said inserts in supported relationship, and means for supporting the elastic body upon the other of said members whereby relative movement and vibration between the unit and support is absorbed by said body, said body being so constructed and arranged as to yield when said beaters are subjected to lateral forces during mixing operations in a plane parallel to the support.

HERMANN M. ALFRED STRAUSS.
WATSON D. HARBAUGH.